United States Patent [19]

Shearn et al.

[11] Patent Number: 5,499,690
[45] Date of Patent: Mar. 19, 1996

[54] INTEGRAL HOOD, RADIATOR AND BUMPER SUPPORT APPARATUS

[75] Inventors: Kenneth M. Shearn, Maple Valley; Gordon S. Kranick, Snohomish; Robert F. Grimstad, Seattle, all of Wash.

[73] Assignee: PACCAR Inc., Bellevue, Wash.

[21] Appl. No.: 191,858

[22] Filed: Feb. 3, 1994

[51] Int. Cl.⁶ ..................................... B60K 11/04
[52] U.S. Cl. ................ 180/68.4; 180/68.6; 296/194
[58] Field of Search .................. 180/68.4, 68.6, 180/69.21, 89.17; 296/194; 165/67

[56] References Cited

U.S. PATENT DOCUMENTS

| | | |
|---|---|---|
| 1,762,328 | 6/1930 | Curello . |
| 1,819,178 | 8/1931 | Kegresse ............................ 180/68.4 |
| 1,874,400 | 8/1932 | White .................................. 180/68.4 |
| 1,874,609 | 8/1932 | Paton .................................. 180/68.4 |
| 2,071,328 | 2/1937 | Brouheit . |
| 2,099,789 | 11/1937 | Baker et al. ........................ 180/68.6 |
| 2,260,578 | 10/1941 | Murray .............................. 180/68.1 |
| 2,325,729 | 8/1943 | Allin .................................. 180/68.1 |
| 2,701,728 | 2/1955 | Miller ................................ 180/313 |
| 2,769,501 | 11/1956 | Wagner ............................ 180/89.17 |
| 2,779,620 | 1/1957 | Reed . |
| 3,017,944 | 1/1962 | Norrie .............................. 180/69.21 |
| 3,123,170 | 3/1964 | Bryant .............................. 180/68.4 |
| 3,165,164 | 12/1965 | Hostetler et al. ................. 180/68.4 |
| 3,174,575 | 3/1965 | May et al. ....................... 180/89.17 |
| 3,638,749 | 2/1972 | Graham et al. ..................... 180/68 |
| 4,281,733 | 8/1981 | Miller et al. ..................... 180/69.21 |
| 4,367,793 | 1/1983 | MacIntosh ......................... 180/68.4 |
| 4,519,467 | 5/1985 | Saunders .......................... 180/68.4 |
| 4,991,675 | 2/1991 | Tosconi et al. ................... 180/69.21 |
| 5,088,572 | 2/1992 | Schroeder et al. ................ 180/68.4 |
| 5,123,695 | 6/1992 | Kanemitsu et al. ................ 296/194 |

*Primary Examiner*—Margaret A. Focarino
*Assistant Examiner*—Min Yu
*Attorney, Agent, or Firm*—Seed and Berry

[57] ABSTRACT

An apparatus which isolates the radiator from the shock and deflection caused by movement of the truck chassis frame during operation of the truck. The apparatus includes a tubular support member connected at a location approximately equidistant from each chassis frame rail to a support member joining chassis frame rails of a truck. The tubular support member is attached to the hood and can also be attached to the front bumper and fenders. Installation of the tubular support member allows designers to contour the hood to the radiator, improving driver visibility and aerodynamics of the truck while not decreasing the fatigue life of the radiator. Securing the bumper to the support apparatus also allows closer fit between the bumper and the hood due to integration of relative movement of these parts.

13 Claims, 4 Drawing Sheets

INTEGRAL HOOD, RADIATOR AND BUMPER SUPPORT APPARATUS

TECHNICAL FIELD

This invention relates to a support apparatus in a truck which isolates the radiator from shock and vibration. More particularly, the invention relates to an apparatus which isolates the radiator from the shock and deflection caused by movement of the truck chassis frame by integrating radiator and hood motion.

BACKGROUND OF THE INVENTION

Various devices have attempted to isolate the radiator from movement of the vehicle chassis frame during vehicle operation. For example, U.S. Pat. No. 3,638,749, to Graham et al., teaches mounting the radiator in a subframe to allow relative movement between the subframe and the chassis frame through the use of coil springs and links with rubber bushings. U.S. Pat. No. 2,071,328, to Broulhiet, teaches coupling a subframe supporting the radiator, lights, and fenders to the vehicle frame aft of the front axle in order to minimize the bending caused by up and down motion imparted on the frame as a result of vertical movement of the front wheels. However, the prior art fails to disclose a support apparatus coupled near its lower center to a support member connecting the chassis frame rails, where the support apparatus integrates relative motion of the hood and radiator in such a manner as to isolate the radiator from twisting and deflection of the frame, simultaneously allowing designers to reduce radiator to hood clearance without decreasing the fatigue life of the radiator. This is particularly important for the design of modern trucks which have the hood closely contoured to the radiator for improved aerodynamics and road visibility.

SUMMARY OF THE INVENTION

In the present invention, the radiator has been mounted on a support member called a radiator support tube which is attached to the hood and can also be attached to other truck body parts like the front bumper and fenders. The radiator support tube is coupled to the chassis frame rails through support members which are connected to the radiator support tube at a central location approximately equidistant from each chassis frame rail. By doing so, the stress imparted on the radiator as a result of one chassis frame rail being elevated vertically relative to the other chassis frame rail is minimized. This twisting can occur for example when the truck is driven over uneven terrain or when one side of the truck strikes an obstacle. Twisting motion is transferred to the radiator support tube which in turn moves the radiator, the truck hood and any other truck body parts attached to the radiator as an integral unit isolating the radiator from stress. The radiator support tube reduces the relative movement between these parts also allowing truck designers to reduce the space between these parts.

In particular, the configuration of the apparatus reduces clearance between the hood and radiator, increasing road visibility and aerodynamics of the truck, simultaneously integrating motion between the hood and radiator thereby isolating the radiator from stresses associated with the twisting motion of the chassis frame rails. Therefore, it is an object of the invention to isolate the radiator from vibration and shock associated with twisting movement of the chassis frame rails. It is also an object of the invention to improve aerodynamics of the truck and the road visibility by reducing the clearance between the hood and the radiator without decreasing fatigue life of the radiator. It is also an object of the invention to substantially integrate the relative movement of the hood, radiator, and other truck body parts attached to the bumper support tube thereby allowing a close fit and reduced tolerance and structure between these attached parts. Another object of the invention is to construct a device which isolates the radiator from the twisting motion associated with operation of the truck in such a manner that access to the engine is not hampered. It is also an object of the invention to locate the radiator in such a position where access to the front end power takeoff is not obstructed and airflow through the radiator for purposes of efficient heat transfer is improved.

BRIEF DESCRIPTION OF THE DRAWINGS

Other objects and a fuller understanding of the invention may be had by referring to the following description and claims, taken in conjunction with the accompanying drawings in which:

DETAILED DESCRIPTION OF THE INVENTION

Figure 1:
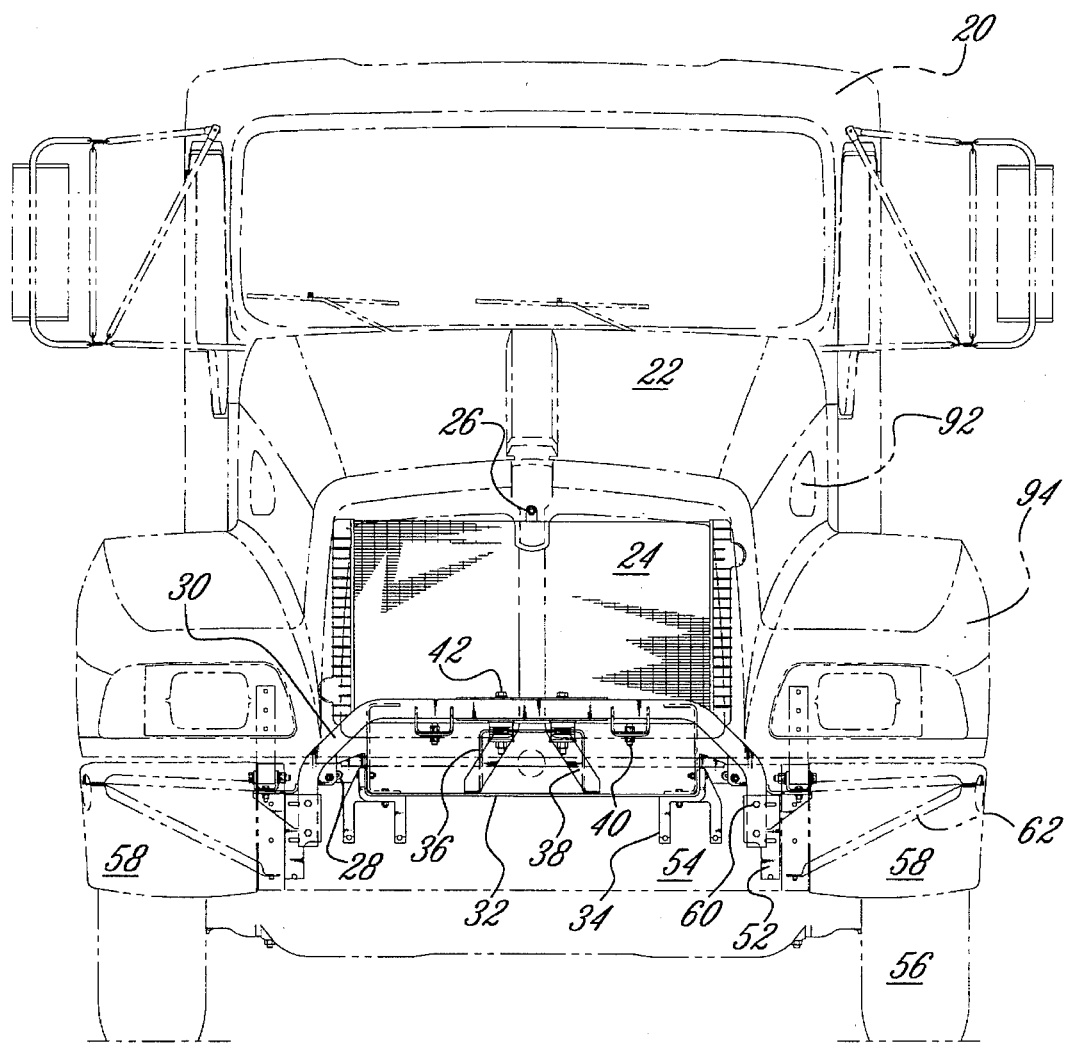
FIG. 1 is a front view of the invention installed in a truck drawn in phantom.

Referring now to the drawings for a better understanding of the invention, FIG. 1 shows the invention installed in a truck drawn in phantom. In a broad sense, the invention comprises integrating relative movement of the hood 22, the radiator 24, and other truck body pans like the bumper 54 or fenders 94 by securing these components to a general support member called the radiator support tube 30. The radiator support tube is coupled to movement of the chassis frame rails 46 near the center of the radiator support tube 30 as shown in FIG. 1. By coupling the relative movement of the chassis frame rails 46 to the center of the radiator support tube 30, i.e., at a location approximately equidistant from each chassis frame rail, a limited amount of pivotal motion from side to side is allowed in relation to movement of the chassis frame rails 46.

Figure 3:
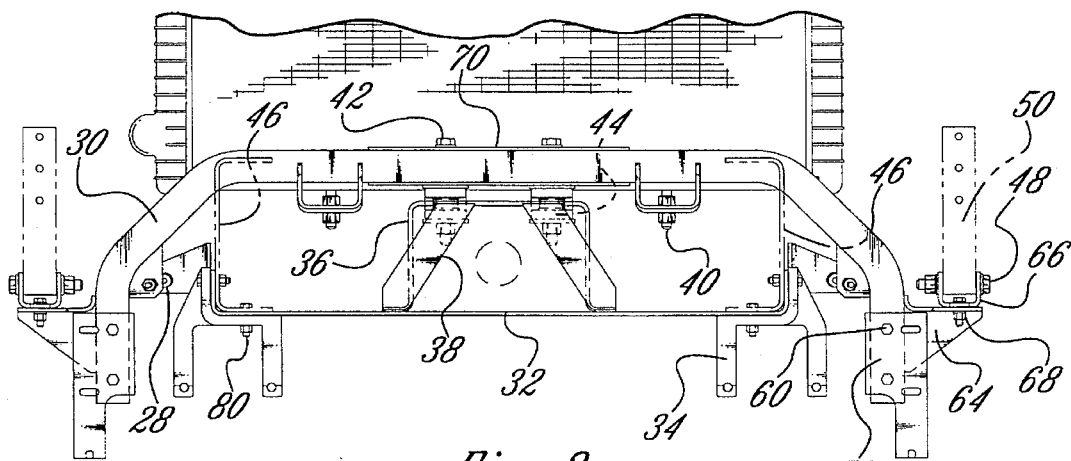
FIG. 3 is a front view of the invention removed from the truck but still attached to the chassis frame rails and associated structure.

As will be observed from FIG. 3, the radiator support tube 30 is coupled at its center to the movement of the chassis rail by virtue of the vertical support bar 36. Bolts 42 secure the vertical support member 36 to the radiator support tube 30. Bushings 44 are used to allow limited but adequate relative movement between the vertical support member 36 and the radiator support tube 30. FIG. 3 depicts a vertical support bar 36 which is coupled at two points near the center of the radiator support tube 30. More or less coupling points can be utilized depending on the size and shape of the truck. Additionally, the coupling points do not have to be located symmetrically about the radiator support tube 30 or exactly equidistant from each chassis frame rail 46. However, the radiator support tube 30 should be secured to the vertical support bar 36 in such a manner as to allow a limited but adequate pivotal motion from side to side. Support plate 70 is added to distribute the stress associated with coupling movement of the chassis frame rails 46 and to strengthen the radiator support tube 30. Similarly, gussets 38 are added to reinforce the vertical support bar 36. Movement of the left and fight chassis frame rails 46 is coupled by horizontal support member 32. The horizontal support member 32 is secured to the chassis frame rail 46 through the use of four bolts 80. Bolts 80 also secure the front drive bracket 34 to the horizontal support member 32. The front drive brackets 34 receive and distribute the forces, shocks, and vibration transmitted through the shock absorbers (not shown).

The radiator support tube 30 is connected at its ends to bumper 54 and the hood 22. If the fenders 94 are not built into the hood 22, the fenders 94 can also be connected to the radiator support tube 30. Similarly, although the front bumper 54 does not have to be attached to the radiator support tube 30 in order to reduce vibration and stress on the radiator 24, attaching front bumper 54 to the radiator support tube has several advantages. However, integrating the relative motion of the hood 22 and the bumper 54, as well as any other truck body parts like fenders 94, by attaching both to the radiator support tube 30 allows truck designers to reduce the gap between the hood 22 and the bumper 54. If the hood 22 and the bumper 54 were not both attached to the radiator support tube 30, a larger gap between them would be necessary since relative motion between the bumper 54 and the hood 22 would be increased. Therefore, FIG. 1 depicts a preferred embodiment comprising a radiator support tube 30 connected to the hood 22 and the bumper 54. Bumper bracket 52 is secured to the radiator support tube 30 and, in turn, the bumper 54 is secured to the bumper support bracket 52. Bumper end caps 58 can also be attached to the radiator support tube 30 by securing bumper end cap support 62 to the radiator support tube 30 through the use of bolts (not shown). Several bolts 60 are used to rigidly secure the bumper 54, the bumper support bracket 52 and the radiator support tube 30. A flange 64 is attached at each end of the radiator support tube 30. The flange is secured to bracket 66 by the use of bolt 68. The bracket 66 contains a hood pivot bolt 48 which allows the hood hinge 50 to rotate freely fore and aft. The hood hinge 50 is secured to the hood 22. At the location where the hood hinge 50 is secured to the hood 22, metal reinforcement (not shown) can be added to the hood 22 in order to prevent cracking of the hood 22 near the interface of the hood hinge 50 and the hood 22. This is especially important in modern trucks which utilize a hood 22 fabricated from lightweight composite materials.

Figure 2:
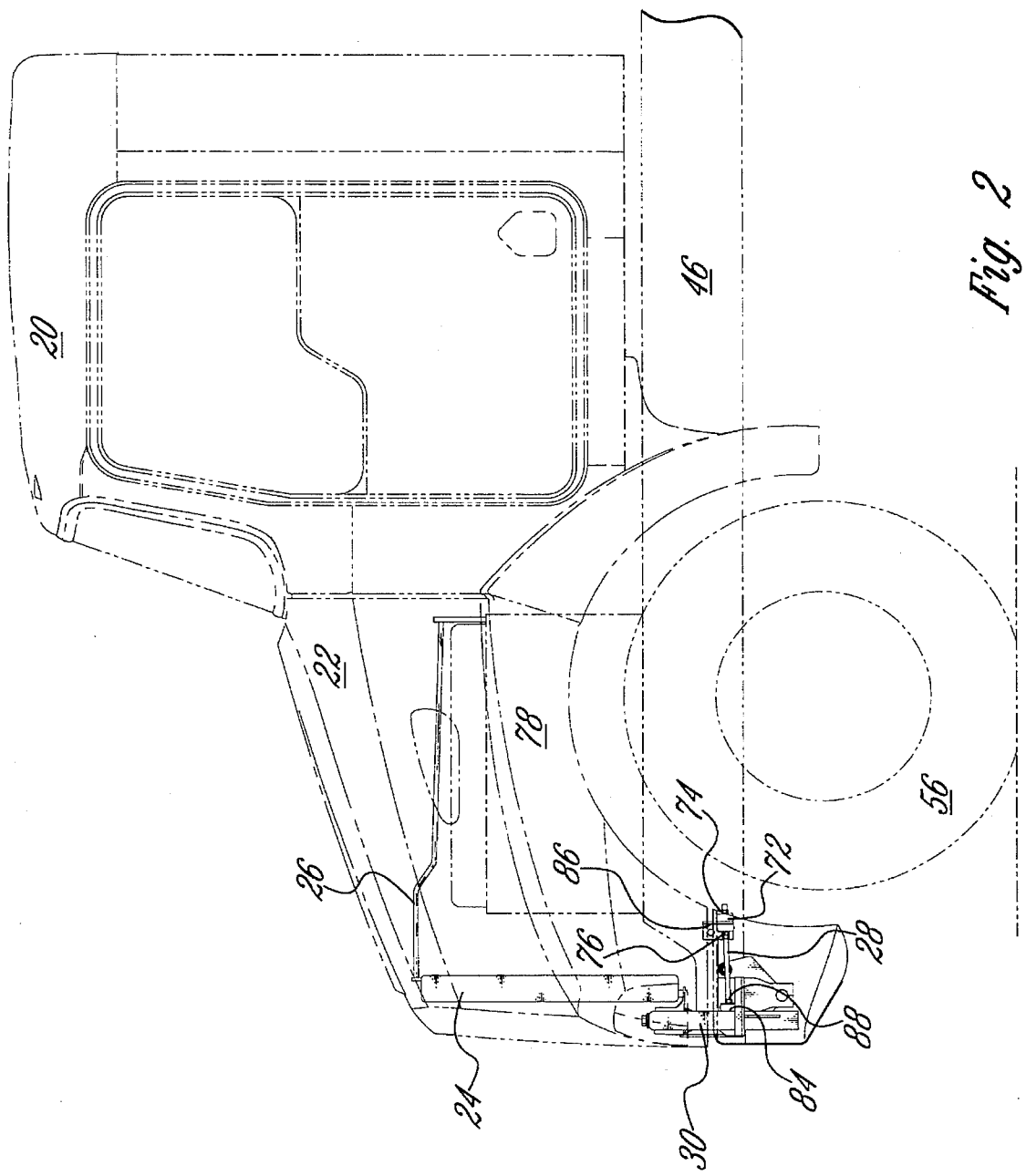
FIG. 2 is a side view of the invention in a truck drawn in phantom.

The radiator 24 is attached at two points to the radiator support tube 30 by bolts 40. FIG. 2 shows the radiator 24 and its relative position between the hood 22, the radiator support tube 30, the engine block 78 and the chassis frame rail 46. The hood 22 is contoured to secure the top of the radiator 24 thereby preventing fore-and-aft movement of the radiator 29 and simultaneously improving aerodynamics and road visibility. Contouring the hood 22 to the top of the radiator 24 also eliminates the need for several tie rods, radiator braces, or other structure for securing the radiator 24. When the hood 22 is pivoted forward in order to allow the operator access to the engine block 78, the radiator tie rod 26 prevents fore-and-aft movement of the radiator 24. Use of only one radiator tie rod 26 serves to secure the radiator 24 when the hood 22 is in an open position while also ensuring that access to the engine block 78 is not hampered. Utilizing only one radiator tie rod 26 also eliminates the stresses incurred when the hood 22 is in an open position and a mechanic is putting weight on the bumper 54 or other structure associated with the radiator support tube 30. That is, the radiator tie rod 26 allows the radiator 24 to freely move from side to side when the hood 22 is in an open position. The prior art taught use of many tie rods or other structure which reinforces the radiator 24 but results in stresses on the radiator 24 when the hood 22 is open and weight is applied on one side of the truck.

As shown in FIG. 3, on either side of the radiator support tube 30 are lower tie rods 28. The lower tie rods 28 serve to prevent fore-and-aft movement of the radiator support tube 30 while allowing motion of the radiator support tube 30 in all other directions. Additionally, the use of lower tie rods 28 allows movement of the radiator support tube 30 independent of the position of each frame rail 46. FIG. 2 shows the side view of a lower tie rod 28. Bushings 74 and bushings 84 are utilized to dampen vibration while still facilitating independent side-to-side or up and down movement of the radiator support tube 30 in relation to the chassis frame rails 46 at the location of the lower tie rods 28. Nuts 74 and 76 serve to clamp the bushings 72 about the flange 86. Similarly, bushings 84 are secured against the radiator support tube 30 by use of nut 88.

Figure 4:
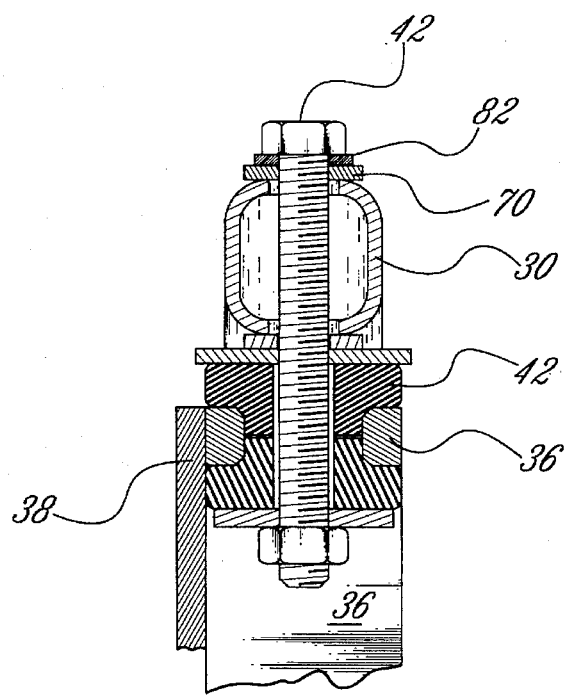
FIG. 4 is a cross-section of the radiator support tube primarily illustrating the location where the radiator support tube is connected to a chassis frame rail support member.

FIG. 4 shows the cross-section of the radiator support tube 30 at a point where the radiator support tube 30 is secured to the vertical support bar 36. The radiator support tube 30 is a tubular. This results in sufficient strength and lighter weight than a solid support member. However, the radiator support tube 30 can be various shapes and even solid. The shape and size of the radiator support tube 30 will be dependent upon the shape and size of the truck. Additionally, those of ordinary skill in the art will appreciate that altering the shape and size of the radiator support tube 30 allows truck designers to contour the hood 22 to the radiator 24 so as to maximize the aerodynamics of the truck. Moreover, those of ordinary skill in the art will appreciate that the size and shape of the radiator support tube 30 can be altered according to size and shape of the truck in order to position the radiator 24 in a location which optimizes airflow through the radiator 24 thereby improving heat transfer characteristics of the radiator 24. A bolt 42 is used to fasten the radiator support tube 30 to the vertical support bar 36. Rubber bushings 44 are interposed between vertical support bar 36 and the radiator support tube 30. Rubber bushings 44 serve to allow a limited amount of movement between the radiator support tube 30 and the vertical support bar 36. As a result of locating the fastening points of the vertical support bar 36 near the center of the radiator support tube 30 approximately equidistant from each chassis frame rail 46, the radiator support tube 30 can pivot a limited amount from side to side relative to the horizontal support member 32. The maximum pivot, measured in degrees of rotation, allowed by the rubber bushings 44 is dependent on the particular dimensions of the truck and corresponding size and shape of the radiator support tube 30 as well as the vertical support bar 36. Those of ordinary skill in the art will appreciate that too much pivot will unduly increase the oscillatory motion of the radiator support tube 30, the radiator 24, the hood 22, and other body parts connected to the radiator support tube 30 like the bumper 54. Likewise, restricting the amount of pivot will result in the radiator support tube 30 being too rigid in relation to movement associated with operation of the truck.

This would result in excessive vibration of the hood 22 and other body parts connected to the radiator support tube 30.

Figure 6B:
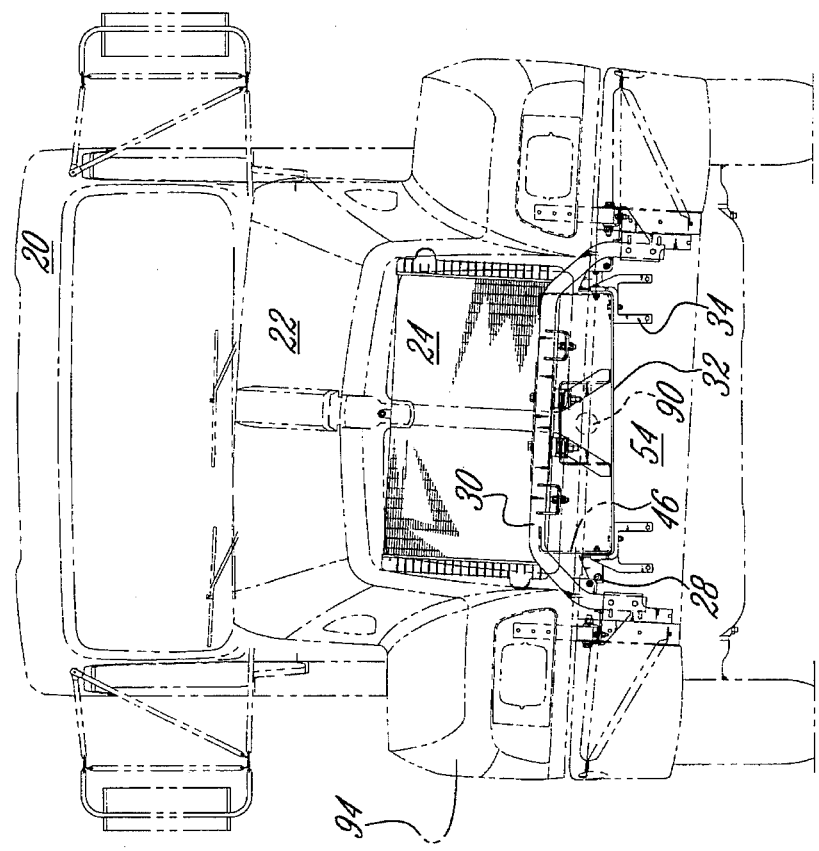
FIGS. 6A and 6B are front views of the invention installed in a truck drawn in phantom illustrating the relative movement of the chassis frame rails to the radiator support tube and associated truck body parts during operation of the truck.
Figure 6A:
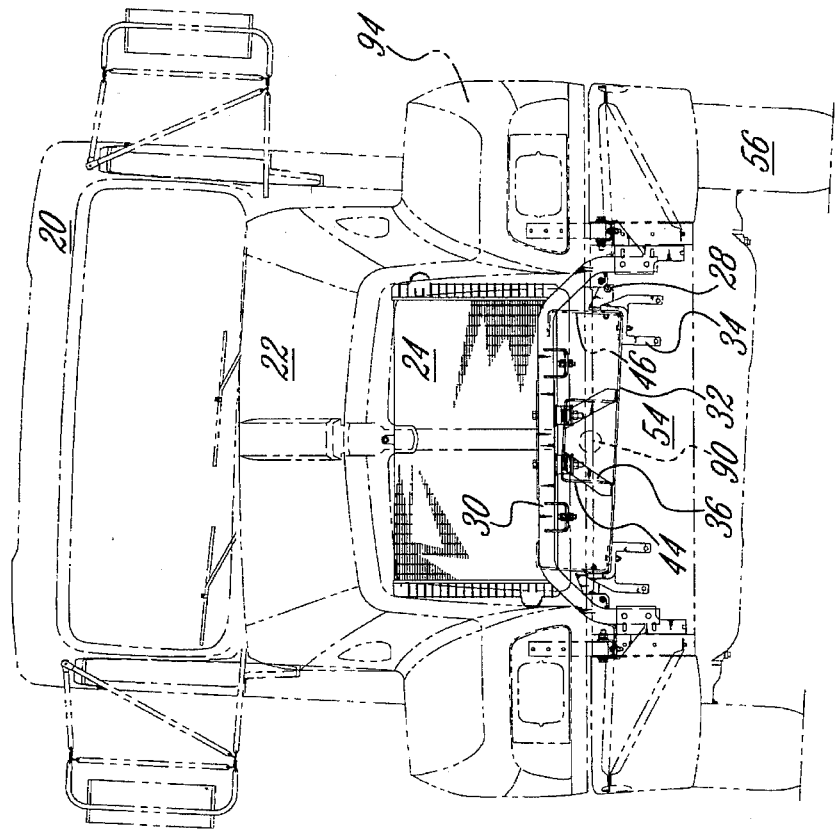

FIG. 6A shows a wheel 56 on the left side of the truck rising vertically as it would if the truck was traveling over uneven terrain or struck an obstacle in the road. FIG. 6B shows the truck on level ground immediately thereafter. In FIG. 6A, the upward travel of the wheel 56 on the left side of the truck is imparted to the front drive racket 34 by virtue of the shock absorbers (not shown). In turn, the front drive bracket 34 on the left side of the truck moves vertically upward in a proportional amount to the upward travel of the wheel 56. As a result that the front drive bracket 34 is fastened to the chassis frame rail 46, the chassis frame rail 46 on the left side also rises vertically above the chassis frame rail 46 on the right side. The chassis frame rail 46 being fixed to the cab 20 results in the cab 20 rising upward on the left side. The horizontal support member 32 as well as the vertical support bar 36 move in relation to the chassis frame rails 46 by virtue of being fastened thereto. However, the bushings 44 interposed between the vertical support bar 36 and the radiator support tube 30 allow a limited amount of side to side pivotal rotation without imparting movement upon the radiator support tube 30. Likewise, the bumper 54, the radiator 24 and the hood 22 do not experience the rotation imparted by the uneven terrain. Eventually, compression of the bushings 44 will impart motion upon the radiator support tube 30. This can be seen in FIG. 6B. That is, the wheels 56 on the left and right side are on level terrain. However, the rotation of the chassis frame rails 34 and members fastened thereto shown in FIG. 6A have been imparted on the radiator support tube 30. As a result of the fact that the radiator support tube 30 shown in FIG. 6A is fastened to the radiator 24, the bumper 54 and the hood 22, all relative movement among these parts is substantially integrated as shown in FIG. 6B. Therefore, the radiator 24 is not subjected to the torsional and normal stress that would occur if the hood 22 moved independently of the radiator 24. FIG. 6A and FIG. 6B demonstrate how the lower tie rods allow the radiator support tube 30 to move up and down in relation to the chassis frame rails 46. That is, the lower tie rods 28 only restrict the radiator support tube 30 from moving fore and aft.

Substantial integration of relative movement between the hood 22 and the radiator 24 allows designers to contour the hood 22 to the radiator 24 increasing visibility of the road and improving aerodynamics of the truck. Additionally, the radiator 24 can be positioned according to the shape of the radiator support tube 30. This allows designers to position the radiator 24 by changing the dimensions of the radiator support tube 30 so that air flow and accordingly, the amount of heat transfer achieved by the radiator 24, can be optimized. Likewise, the radiator support tube 30 can be designed to maximize the distance between the horizontal support member 32 and the radiator support tube 30. This allows access to the front end power take-off 90. As a result of the fact that the hood 22 moves independently of the cab 20 as shown in FIG. 6A and 6B results in higher stresses throughout the hood 22. Therefore, to prevent fatigue cracking of the hood 22, the hood 22 can be made thicker or can be reinforced in particular locations depending on the size and shape of the truck. For example, the hood 22 in FIG. 1 can be reinforced on the inside of the air vents 92 to increase the durability of the hood 22.

Figure 5:
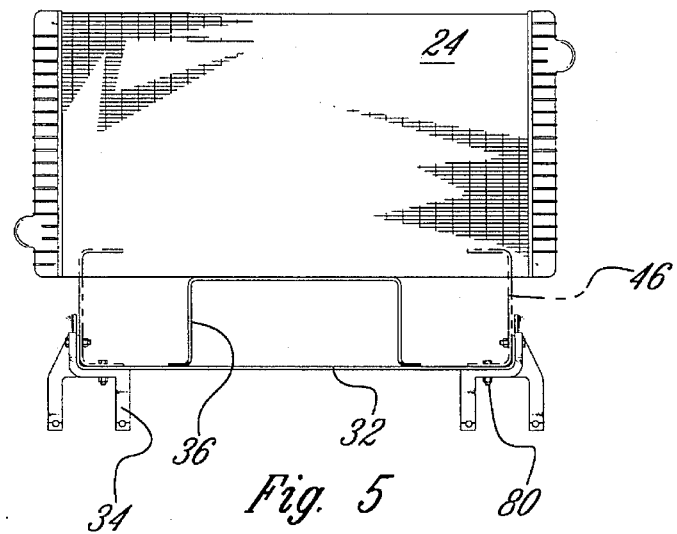
FIG. 5 illustrates a prior art arrangement for mounting the radiator in a truck.

Improving the aerodynamics of the truck and improving road visibility by contouring the hood 22 to the radiator 24 would have disadvantages in the prior art design shown in FIG. 5. In the prior art design, when the truck experiences uneven terrain, the rotation of chassis frame rails 46 would be imparted on the radiator 24 through the horizontal support member 32 and vertical support bar 36. Therefore, the radiator 24 would be rotated in an amount proportional to the rotation of the chassis frame rails 46. However, unlike the integral hood, radiator and bumper support apparatus, the movement associated with the radiator 24 would not be integrated to the bumper 54 or the hood 22. As a result, the hood 22 would move independently of radiator 24 and the twisting imparted by the uneven terrain upon the chassis frame rail 46 would result in movement of the radiator 24 without uniform movement of the hood 22. This would reduce the fatigue life of the radiator 24 and significantly offset the advantages of contouring the hood 22 to the radiator 24 in order to improve visibility and aerodynamics of the truck. Additionally, the bumper 54 could not be as closely positioned to the hood 22 as mentioned earlier.

Although the invention has been described in its preferred form with a certain degree of particularity, it is understood that the present disclosure of the preferred form has been made only by way of example and numerous changes in the details of the construction as well as the combination and arrangements of the parts may be resorted to without departing from the spirit and the scope of the invention as hereinafter claimed.

What is claimed is:

1. An improved integral hood and radiator support apparatus in a truck, the improvement comprising:

a hood;

a radiator:

two chassis frame rails extending longitudinally fore and aft;

a radiator support tube substantially perpendicular to said chassis frame rails, said radiator support tube located near the front end of said chassis frame rails, said radiator support tube secured to said hood, said radiator support tube having a top portion secured to the bottom portion of said radiator, said radiator support tube substantially integrating relative movement of said hood and said radiator;

fastening means securing the hood to the radiator support tube substantially minimizing relative movement between said hood and said radiator support tube when said hood is closed; and a horizontal support member between each of said chassis frame rails, said horizontal support member secured to each of said chassis frame rails near the front end of said chassis frame rails, said horizontal support member secured to said radiator support tube near the center of said radiator support tube.

2. The apparatus as set forth in claim 1, further including one set of bushing means of resilient material, said bushing means interposed between said horizontal support member and said radiator support tube, said bushing means dampening vibratory motion and allowing limited amount of side-to-side pivotal motion of said radiator support tube.

3. The apparatus as set forth in claim 1, further including a tie rod, said tie rod having one end secured to the upper portion of said radiator, said tie rod having another end secured after of said radiator, said tie rod preventing independent fore-and-after motion of said radiator.

4. The apparatus as set forth in claim 1, further including a plurality of lower tie rods, said lower tie rods secured at one end to said radiator support tube, said lower tie rods secured at another end to said chassis frame rails, said lower tie rods restricting fore-and aft movement of said radiator support tube.

5. The apparatus in accordance with claim 1, further including means for attaching a bumper to said radiator support tube.

6. An improved hood and radiator support apparatus in a truck, the improvement comprising:

a hood;

a radiator;

two chassis frame rails, extending longitudinally fore and aft; horizontal support means between each of said chassis frame rails, said horizontal support means secured to each of said chassis frame rails near the front end of said chassis frame rails;

radiator support means substantially perpendicular to said chassis frame rails, said radiator support means located near the front end of said chassis frame rails, said radiator support means secured to said radiator, said radiator support means secured to said hood, said radiator means substantially integrating relative movement of said hood and radiator;

fastening means for securing said hood to said radiator support means substantially minimizing relative movement between said hood and said radiator support means when said hood is closed; and vertical support means secured to said horizontal support means, said vertical support means extending upward and secured to said radiator support means allowing a limited amount of side-to-side relative motion between said radiator support means and said horizontal support means.

7. An improved integral hood and radiator support apparatus in a truck, the improvement comprising:

a hood;

a radiator;

two chassis frame rails extending longitudinally fore-and-aft;

a horizontal support member between each of said chassis frame rails, said horizontal support member having two ends, each end of said horizontal member secured to each of said chassis frame rails near the front end of said chassis frame rail;

a radiator support tube substantially perpendicular to said chassis frame rails, said radiator support tube located near the front end of said chassis frame rails, said radiator support tube having a top portion secured to the bottom of said radiator, said radiator support tube substantially integrating relative movement of said hood and radiator;

fastening means for securing said hood to said radiator support tube substantially minimizing relative movement between said hood and said radiator support tube when said hood is closed; and support means secured to said horizontal support member, said support means extending upward and secured to said radiator support tube at a location approximately equidistant from each said chassis frame rail.

8. The apparatus as set forth in claim 7, further including means for attaching a bumper to said radiator support tube.

9. The apparatus set forth in claim 7, further including means for attaching fenders to said radiator support tube.

10. The apparatus as set forth in claim 7, wherein the support means consists of a vertical support bar having two ends, said vertical bar having both ends secured to said horizontal support member, said vertical support bar extending upward and secured to said radiator support tube.

11. The apparatus as set forth in claim 7, further including a plurality of bushing means of resilient material, said bushing means interposed between said support means and said radiator support tube, said bushing means allowing a limited amount of side-to-side pivotal motion of said radiator support tube in relation to said horizontal support member.

12. The apparatus as set forth in claim 7, further including a plurality of lower tie rods, said lower tie rods connected at one end to said radiator support tube, said lower tie rods connected at another end to said chassis frame rails, said lower tie rods restricting fore-and-aft movement of said radiator support tube.

13. The apparatus as set forth in claim 7, further including a tie rod, said tie rod having one end connected to the upper portion of said radiator, said tie rod having another end secured aft of said radiator, said tie rod preventing independent fore-and-aft motion of said radiator.

* * * * *